United States Patent [19]
Blanding et al.

[11] Patent Number: 4,549,928
[45] Date of Patent: Oct. 29, 1985

[54] TELEVISION PANEL AND METHOD OF MANUFACTURE

[75] Inventors: Wendell S. Blanding, Painted Post, N.Y.; Ronald E. Johnson, Tioga, Pa.; Robert V. VanDewoestine, Corning, N.Y.

[73] Assignee: Corning Glass Works, Corning, N.Y.

[21] Appl. No.: 427,515

[22] Filed: Sep. 29, 1982

[51] Int. Cl.[4] .......................... B44C 1/44; B32B 31/00; C03C 15/00; B41C 1/00

[52] U.S. Cl. .................................... 156/660; 156/233; 156/235; 156/240; 156/277; 156/539; 101/34; 313/470

[58] Field of Search ................. 101/211, 151, 152, 34, 101/33; 430/25, 23; 313/470; 156/230, 233, 235, 240, 239, 249, 277, 67, 89, 641, 660, 659.1, 539, 540

[56] References Cited

U.S. PATENT DOCUMENTS

| | | | |
|---|---|---|---|
| 2,434,019 | 1/1948 | Switzer | 101/211 |
| 2,625,734 | 1/1953 | Law | 101/211 |
| 3,752,072 | 8/1973 | Lorber | 101/211 |
| 3,758,302 | 9/1973 | Grohe | 101/211 |
| 4,263,085 | 4/1981 | Ellis | 156/235 |
| 4,379,818 | 4/1983 | Lock et al. | 156/659.1 |
| 4,440,589 | 4/1984 | Lock | 156/235 |
| 4,440,590 | 4/1984 | Collins | 156/240 |
| 4,480,540 | 11/1984 | Lock et al. | 101/36 |

OTHER PUBLICATIONS

Garwin, IBM Technical Disclosure Bulletin, vol. 25, No. 5, Oct. 1982, p. 2598.

*Primary Examiner*—Edward Kimlin
*Assistant Examiner*—L. Falasco
*Attorney, Agent, or Firm*—B. R. Turner

[57] ABSTRACT

A collector printing process is utilized for applying thermoplastic pressure-sensitive inks, corresponding to the color TV phosphors and the black matrix, onto the inner face of the TV panel. Separate inks, formed of inorganic pigments and a thermoplastic pressure-sensitive medium, are each separately patterned. The separate inks are then printed in registration onto a collector to form a composite pattern. Upon completion, the composite pattern is completely transferred to the TV panel by contact of the collector against the inner panel face to form the target.

9 Claims, 6 Drawing Figures

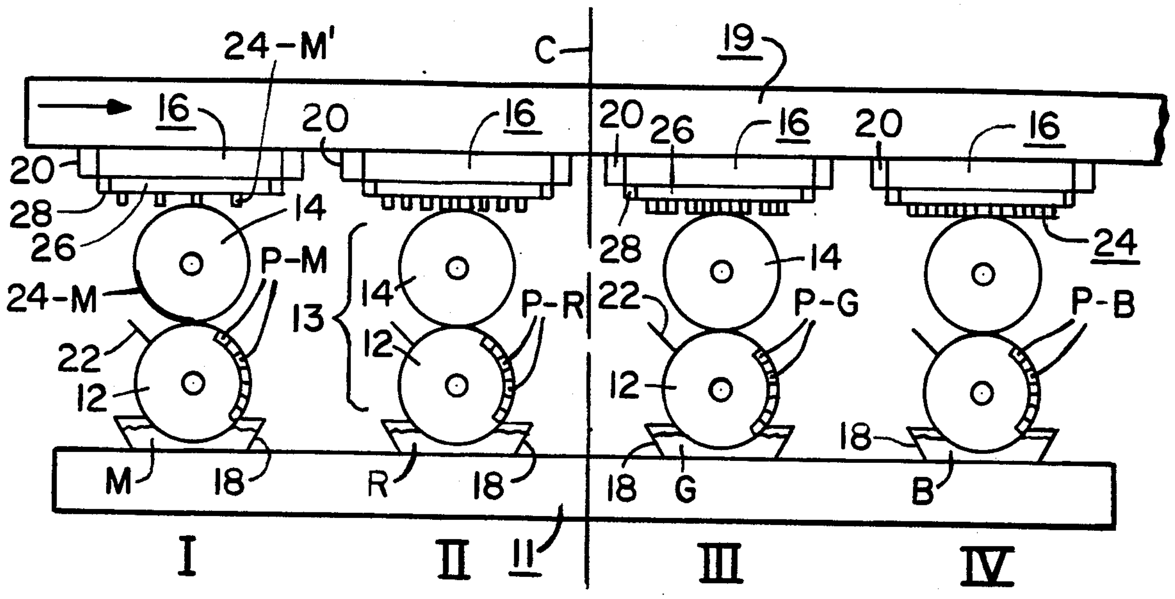
Fig. 1
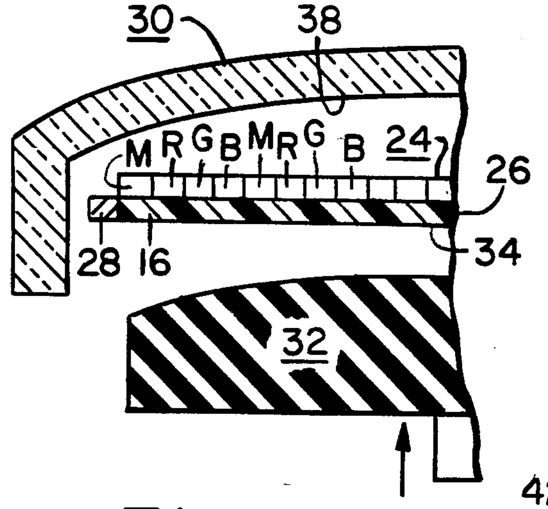
Fig. 2a
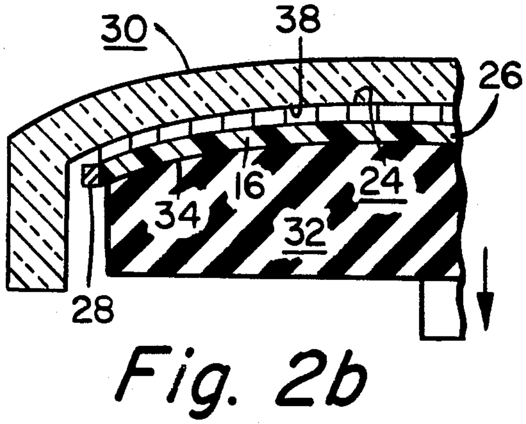
Fig. 2b
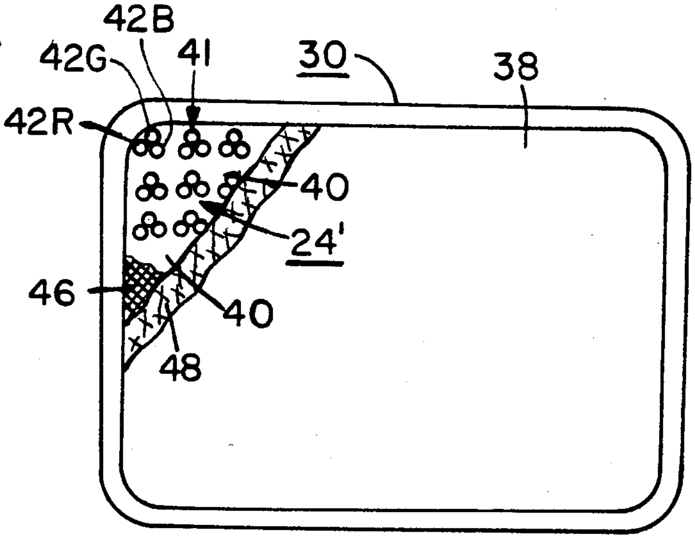
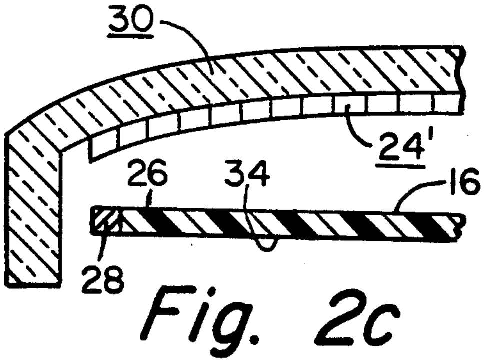
Fig. 2c
Fig. 3

TELEVISION PANEL AND METHOD OF MANUFACTURE

BACKGROUND OF THE INVENTION

The invention relates to a TV picture tube panel and a method of manufacture. More particularly, the invention discloses a color TV picture tube panel, wherein the target is printed onto an inner face of the panel. Preferably, a collector printing process is utilized.

In a conventional color TV bulb, the target comprises an array of triads of separate color phosphors and a black matrix or background. Each phosphor and the background is separately deposited onto the inner surface of the panel.

BLACK MATRIX

In a conventional method of forming the black matrix, a first coating, containing ammonium dichromate and a photosensitive polymer, is applied onto the panel. The coating is then dried. Thereafter, the panel is placed in a device known as a lighthouse. The coating is selectively exposed to radiant energy through an aperture mask, and the exposed photosensitive polymer becomes set in a positive pattern corresponding to the location of the apertures in the mask. The unexposed portion of the coating is washed away. The remaining positive pattern, which is known as a dot pattern, may comprise triads of circles, rectangles or lines.

A second coating of colloidial carbon particles in an aqueous solution, such as sold under the trademark "Aquadag," is applied over the inner face of the panel and the dot pattern. After drying, the second coating is washed with aqueous ammonia which dissolves the set polymer under the Aquadag. The set polymer and Aquadag coatings are removed in those areas where they are superjacent, leaving a negative of the pattern of triads. In the remaining areas, the Aquadag coating remains adhered to the panel and serves as the completed black matrix.

COLOR PHOSPHORS

Each of the phosphors (green, red and blue), in the conventional forming process, is suspended in a separate aqueous solution of a photosensitive polymer to form a separate color slurry, and each slurry is separately handled in a series of successive operations. A first color slurry is applied over the inner surface of the TV panel. The slurry is dried and forms a coating over the background and negative pattern. After drying, the coating is exposed at a selected one of the negative dots of each triad. The aperture mask used for forming the black matrix is also used for exposing the coating. The photosensitive polymer sets and becomes insolubilized at each of the exposed dots, and the coating is washed to remove the unexposed material. The first of the phosphor materials is located in a precise pattern of dots, one for each triad. The sequence is separately repeated for the remaining phosphors, and the target array is thus completed.

FINISHING

A smooth organic sealant layer is then applied over the target in the conventional forming process, and a conductive layer of aluminum is sputtered over the sealant layer. Finally, the panel is fired, thereby burning out all the organic constituents. The completed panel is mated with the same aperture mask used to expose the black matrix and color phosphors.

The process is relatively complex and costly, but excellent registration accuracy is maintained among the various components.

In the present invention, application of the target onto the inner face of the TV panel is reduced to a single application step. The separate color phosphors and black pigments are separately mixed with a hot-melt, heat processable, organic medium to form separate ink compositions. The term hot-melt refers to thermoplastic compositions which reversably soften with heat and also high viscosity pastes which are tacky at room temperature. Preferred media are disclosed in U.S. patent application Ser. No. 202,648, filed July 24, 1979.

The inks are registerably printed onto a collector surface in the target pattern. A preferred printing apparatus for applying the ink compositions is set forth in U.S. patent application Ser. No. 332,723, filed Dec. 12, 1981. A major advantage of collector printing is that registration may be held to close tolerances and is independant of substrate geometry. The registered target pattern is transferred from the collector to the panel by intimate contact. Finishing is accomplished as set forth above.

The invention is useful for the manufacture of TV tubes having a shadow-mask and in more recently developed TV tubes, which do not require a shadow-mask.

SUMMARY OF THE INVENTION

A TV panel and method of manufacture are disclosed. A offset gravure printing process is utilized for registerably printing a target onto a collector. The target is thereafter completely transferred to the panel by intimate mechanical contact of the same with the collector.

DESCRIPTION OF THE DRAWINGS

FIG. 1 is a schematic representation of a collector printing apparatus for use in the present invention.

FIGS. 2*a*, 2*b*, and 2*c* are sequential drawings showing printing from a flexible membrane onto a color TV panel.

FIG. 3 is a schematic plan view of the panel with an exemplary portion of the target illustrated.

DESCRIPTION OF THE PREFERRED EMBODIMENTS

Figure 4:
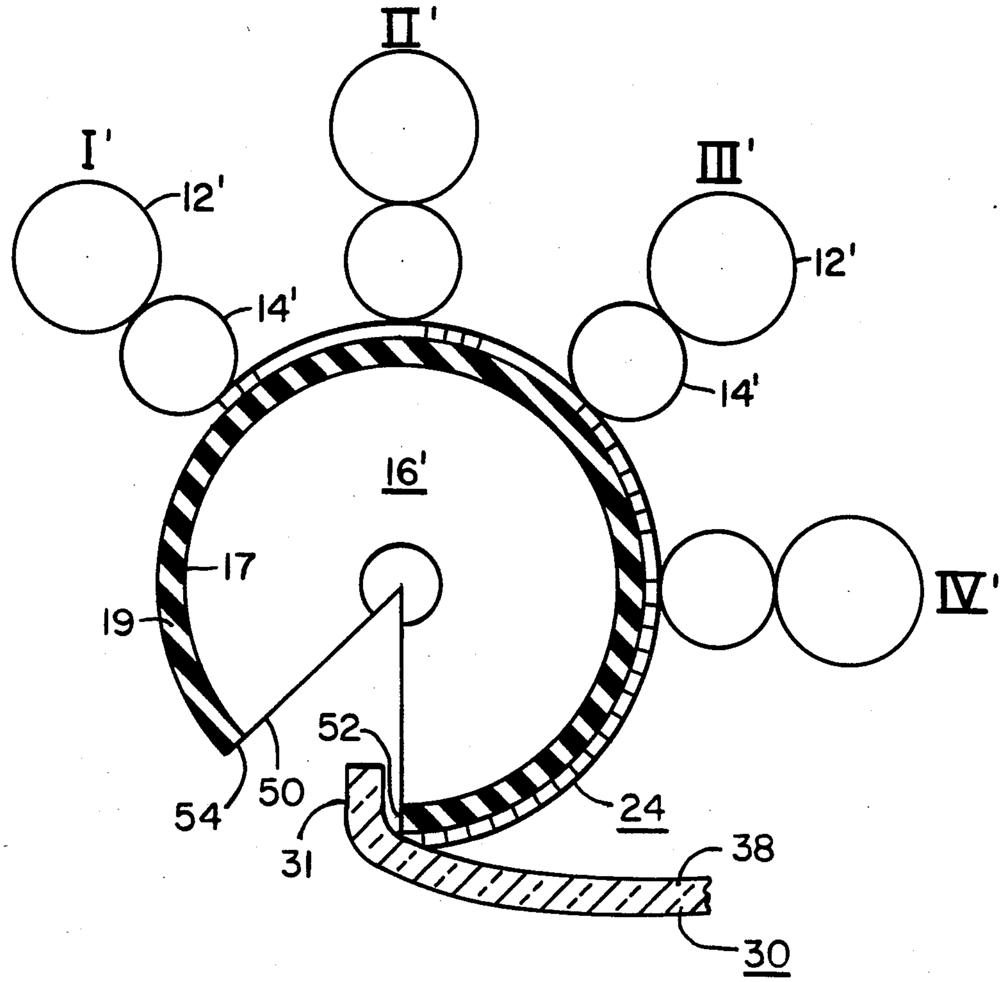
FIG. 4 is a schematic illustration of an alternate embodiment of the present invention utilizing a cylindrical collector.

The present invention uses separately formulated inks to print the target of a TV panel. The inks comprise a heat-processable, pressure-sensitive, hot melt medium mixed with a pigment. The preferred media are disclosed in the copending U.S. patent application Ser. No. 202,648, referred to above. The preferred media melt when heated above room temperature. The media form cohesive, pressure-sensitive, tacky films when cooled to near room temperature. The pigments are conventional materials used in the TV industry, namely: green, red, and blue phosphors for the colors and a black graphite for the background.

A preferred printing device is a gravure printer as disclosed in the copending U.S. patent application Ser. No. 332,723, referred to above. The printing device includes: a collector, separate transfer surfaces, heated gravure surfaces, and separate supplies of melted thermoplastic, pressure-sensitive ink.

Each heated gravure surface has a different recessed gravure pattern etched therein for receiving a corresponding ink from its separate supply. Because the gravure surface is heated, the inks remain molten while in contact therewith. The corresponding transfer surface, formed of an elastomeric silicone material, contacts the hot fluid ink in the recessed gravure pattern. The ink splits almost evenly between the two surfaces, leaving an impression of the pattern on the transfer surface. The ink carried by the transfer surface immediately cools upon contact therewith, and thereby forms a cohesive, pressure-sensitive, tacky film. The transfer surface, carrying the tacky film, is intimately contacted with the collector formed of an elastomeric silicone material. The ink transfers completely from the transfer surface to the collector.

The separate patterns developed by the separate gravure surfaces are printed on the collector in registration. This means that each separate ink pattern is printed on the collector in a specific geometric relation with each of the other ink patterns. Registration is accomplished by alignment of the components. When all of the inks are printed on the collector in the proper relation, the target is established. Once established, the target may be completely transferred to the panel by intimate contact of the collector with said panel.

The complete and successive transfer of the separate ink from each transfer surface to the collector and then from the collector to the panel occurs for a number of reasons. The inks are tacky. They tend to stick to almost anything upon contact The respective surfaces are formulated so that the inks have increasing affinity for the transfer surface, the collector and the panel, respectively. The inks form cohesive films when cool. Thus when transfer occurs, it is complete because the film holds together. The films neither split nor tear.

FIG. 1 is a schematic drawing exemplary of a printing device described in U.S. patent application Ser. No. 332,726 filed Dec. 21, 1981 now U.S. Pat. No. 4,440,589. The present invention utilizes at least four printing stations I–IV, one for each color phosphor and one for the black matrix. Each printing station I–IV includes a heated ink trough 18; a heated gravure roll 12 and a transfer roll 14 mounted in pairs 13 on base plate 11 by means not shown; and a doctor blade 22. A turret 19, mounted for rotation about a central axis C, carries collectors 16 in holders 20. Each collector 16 includes a flexible silicone membrane 26 secured in a frame 28.

Each ink trough 18 carries a separate ink formulation for deposition onto a gravure roll 12 (e.g., M-black matrix, R-red, G-green, and B-blue).

Each gravure roll 12 has a selected pattern etched therein. For example, at station I gravure roll 12 has a pattern P-M corresponding to the desired configuration of the black matrix. The black ink M carried in heated trough 18 is a melted graphite-filled thermoplastic fluid. The ink M, deposited on gravure roll 12 at station I, is doctored in a conventional manner by blade 22. Ink M in pattern P-M on gravure roll 12 is carried into intimate contact with transfer roll 14, whereupon the ink M is split between such rolls. Thus, pattern P-M is reproduced on transfer roll 14. The ink M deposited onto cool transfer roll 14 forms a tacky cohesive film 24-M. The film 24-M is brought into intimate contact with collector 16. In this instance, the ink M forming film 24-M does not split, but completely transfers from the transfer roll 14 to the collector 16. The pattern P-M, generated on gravure roll 12, is thereby formed on collector 16 as film 24-M'.

The above process is repeated at stations II, III and IV for the remaining inks R, G, and B. Respective patterns P-R, P-G and P-B are then deposited in registration onto collector 16 as a composite film 24. There is no print back from any collector 16 to any of the transfer rolls 14, because the inks have a higher affinity for the collector 16 than the corresponding transfer rolls 14.

The collector 16 is removed from holder 20 after receiving the composite film 24, and is locked in position within a TV panel 30 by means not shown (see FIG. 2*a*). Flexible plunger 32 engages a rear side 34 of membrane 26 and urges the membrane 26 and film 24 carried thereby against an inside surface 38 of panel 30 (see FIG. 2*b*). The film 24 preferentially adheres to the inside surface 38 of panel 30. The plunger 32 is withdrawn. The membrane 26 relaxes and peels away from the film 24, which becomes target 24' (see FIG. 2*c*).

In FIG. 3 an illustrative portion of target 24' is shown. The target 24' comprises black matrix 40 and triads 41 formed of a green dot 42G, a red dot 42R and a blue dot 42B. The black matrix 40 comprises the pattern P-M produced at station I using ink M. The dots 42R, 42G and 42B correspond respectively to the patterns P-R, P-G, and P-B printed from the respective inks R, G and B at stations II-IV.

The target 24' is finished with an organic sealant 46 and sputtered aluminum coating 48. The panel 30 is thereafter fired. The organic materials are burned off. The inorganic pigments forming the black matrix and color phosphors and the aluminum coating remain.

In another embodiment the collector 16 may be a fiberglass reinforced silicone blanket. Transfer of the film 24 to the panel 30 may be effected by applying pressure with a roll on the opposite side of the blanket. The Fiberglass helps to minimize distortion of the blanket during transfer of the Film 24 to Panel 30.

In the embodiment of FIG. 4, the collector 16' may be a cylindrical roll 17 covered with an elastomer 19. The collector 16' receives the composite film 24 from respective paired cylindrical gravure and transfer rolls 12' and 14' located at circumferential positions or printing stations I'–IV' about the collector 16'. A more detailed discussion of such an arrangement is disclosed in U.S. patent application Ser. No. 173,129, filed July 28, 1980 now U.S. Pat. No. 4,445,432. The collector 16' has a cut 50 formed therein for allowing collector 16' to print the entire inside surface 38 of the panel 30. The cut 50 provides clearance between the peripheral skirt portion 31 of the mask 30 and respective leading and lagging edges 52–54 of cut 50.

It is also possible to utilize a double collector system. For example the collector 16' in FIG. 4 may print to another collector, such as the membrane collector 16 illustrated in FIGS. 1–3. The membrane collector 16 may then be engaged against a TV panel as set forth above.

It is possible to use raised flexographic rolls with plain inking rolls, as described in U.S. Pat. No. 4,292,104, for printing onto the collector 16. Moreover, it is possible to produce decals, of the type described in the above U.S. Patent, for application into the panel 31.

The target 24' produced in accordance with the teachings of the present invention may be used with a shadow-mask as described in U.S. patent application, Ser. No. 427,731, filed this same date. The shadow-mask is manufactured to have apertures in registration with the triads of color phosphors on the panel. Thus, the shadow-mask is interchangeable with various panels of similar manufacture (see Ser. No. 427,514 filed this same date).

Unless otherwise stated, the patents and applications for patents referred to above are assigned to the assignee of the present invention and are incorporated herein by reference.

We claim:

1. A method of producing a target for a color TV panel, the target formed of a composite pattern of a black matrix and respective red, blue and green color phosphors comprising the steps of: formulating a separate composition of thermoplastic, pressure-sensitive ink for each of the black matrix and color phosphors, said inks exhibiting cohesive strength and pressure sensitivity at near room temperature; forming each composition into a corresponding separate pattern; establishing the black matrix and respective color phosphors in the separate patterns on separate surfaces; completely transferring and registrably combining the separate patterns into the composite pattern onto at least one collector; and completely transferring the composite pattern from the collector to the panel to form the target thereon.

2. A method as set forth in claim 1 wherein establishing the separate patterns on separate surfaces comprises the steps of: melting the thermoplastic inks; depositing each melted ink on a separate corresponding heated ink-carrying surface; and contacting each ink-carrying surface with a separate corresponding relatively cool transfer surface, and splitting each ink between the ink-carrying surface and transfer surface.

3. A method as set forth in claim 2 wherein establishing the separate patterns further comprises the steps of: establishing patterns corresponding to each separate ink pattern for each of the black matrix and each color phosphor on at least a corresponding one of the separate ink-carrying surface and the transfer surface.

4. A method as set forth in claim 2 wherein establishing the patterns comprises at least one of the steps of: producing a gravure etching in the ink-carrying surface and producing a raised flexographic pattern in the transfer surface.

5. A method as set forth in claim 2 further comprising the steps of: establishing affinity of the ink for the transfer surface, the collector and the panel in order of increasing affinity.

6. A method as set forth in claim 5 wherein registrably combining the separate patterns comprises the steps of: sequentially contacting each separate transfer surface with the collector in intimate mechanical contact, whereby the separate inks adhere preferentially to the collector.

7. A method as set forth in claim 1 wherein formulating the inks comprises the steps of combining separate inorganic pigments for each color and the black matrix in a hot melt,

8. A method as set forth in claim 7 further comprising the steps of: depositing an organic layer and conductive reflective film over the target after it has been transferred to the panel, and firing the panel at a sufficient temperature for volatilizing organic compounds present to thereby permanently affix the target onto the panel.

9. A method of producing a target for a color TV panel formed of separate patterns corresponding to a background matrix and respective color, phosphors comprising the steps of: establishing separate thermoplastic ink patterns of each of the background matrix and color phosphors onto separate surfaces, collecting the separate patterns in registration onto a common surface as a composite pattern; and transferring the entire composite pattern onto the panel by intimate contact of the common surface and the panel in a single pass for forming the target on the panel.

* * * * *